April 22, 1952  H. BROSCHKE  2,593,837
MOTOR AND BRAKE CONTROL
Filed July 6, 1950

HEINRICH BROSCHKE
INVENTOR

Patented Apr. 22, 1952

2,593,837

UNITED STATES PATENT OFFICE 2,593,837

MOTOR AND BRAKE CONTROL

Heinrich Broschke, Wetzlar, Germany, assignor to Ernst Leitz, G. m. b. H., Wetzlar, Germany, a corporation of Germany Application July 6, 1950, Serial No. 172,284
In Germany October 10, 1949

2 Claims. (Cl. 192—2)

This invention relates to improvements in scale marking machines of the type disclosed in the U. S. Patent 2,221,577, November 12, 1940. The patent covers a machine which is selectively operated by an electric motor or by hand. A mechanism is provided for automatically closing the motor circuit when the machine is to be manually operated and vice versa. In the patent the motor is directly connected to the operating shaft of the machine.

The object of this invention is to improve and still further develop the patented disclosure by providing the machine with means for clamping the scale disk in its several angular positions, said means including a switch mechanism for controlling the motor circuit in response to the operation of the clamping means and in response to the selection of hand operation.

Figure 1:
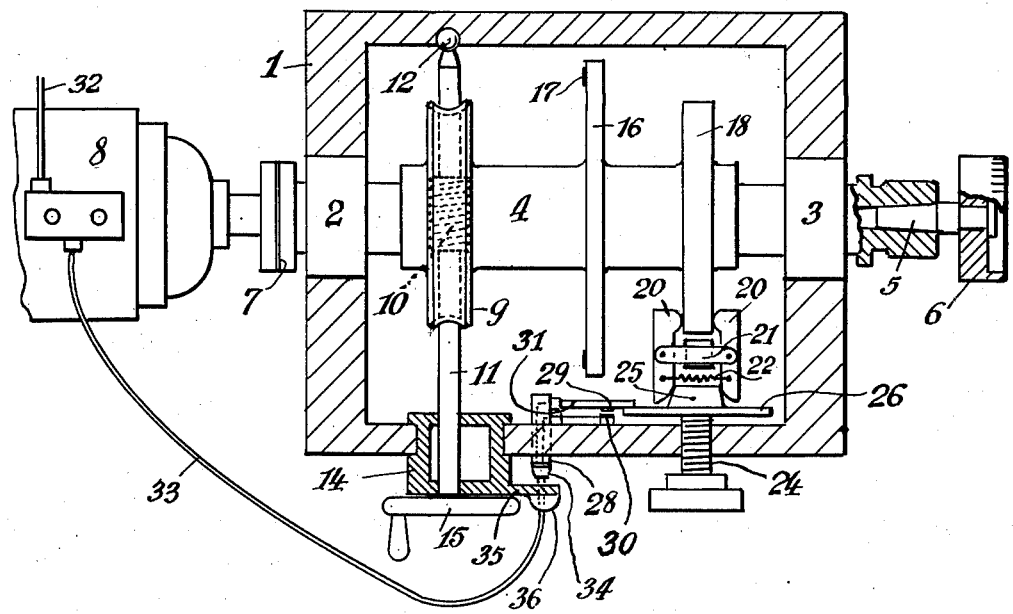

The invention is embodied in a machine in which the motor is not directly connected to the operating shaft of the machine. The motor circuit is contained within a cable passing from the motor to the machine. The free end of the cable has a terminals push plug adapted to be inserted in a terminals receiver socket mounted upon the machine. The hand operated means are so arranged that the plug cannot be inserted in the socket when hand operation is desired and vice versa. Also, the motor circuit cannot be closed when the scale disk is clamped as aforesaid and vice versa. In the accompanying drawing illustrating the invention Fig. 1 is a view, partly in section and partly broken away, of a scale marking machine embodying the invention.

Figure 2:
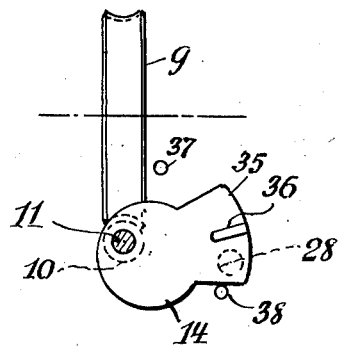
Figure 3:
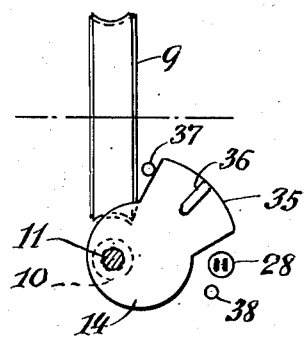

Figs. 2 and 3 show the terminals receiving socket in covered and uncovered positions, respectively.

The machine is contained within a housing 1 with bearings 2 and 3 for the support of the scale disk shaft 4. The shaft carries a mandrel 5 to which the work piece or blank 6 is secured. At the other end the shaft is at 7 clutched to an electric motor 8. The shaft 4 carries a worm wheel 9 adapted to mesh with a worm 10 on a manually operated shaft 11. The latter is supported in the housing at 12 and in front in a bearing 14 in which the shaft 11 is eccentrically located. The shaft has a hand wheel 15.

The main shaft 4 carries the scale disk 16 with scale marks 17, and a clamping disk 18. The latter is adapted to be clamped between two jaws 20 pivotally supported in the housing as at 21 and normally held apart by a spring 22. In the housing is mounted a threaded shaft 24 which carries a cone shaped head 25 and a disk 26. In the housing is further supported a switch mechanism having an accessible terminals receiver socket 28 connected to switch terminals 29 and 30. A spring 31 tends to close the terminals 29 and 30, which lie within the circumference of the aforesaid disk 26. The motor 8 is fed through a cable 32 and the circuit is continued through another cable 33 having the push plug 34 with the circuit terminals. The bearing 14 has an arm 35 with a finger grip 36.

When work is to be done the machine is clutched to the motor but the latter cannot start until the electric circuit is closed by plugging the terminals plug 34 into the socket 28. This, however, cannot be done unless the worm 10 is disconnected from the wormwheel 9 by rotating the bearing 14 counterclockwise as shown in Fig. 3 to uncover the socket 28, which otherwise is hidden or covered by the arm 35. The latter is moved and the bearing rotated by the finger grip 36. If the members 9 and 10 are connected as in Fig. 2, the socket 28 is covered and the plug 34 cannot be inserted. The movements of the arm 35 may be limited by stops 37, 38.

Irrespective of whether the worm 10 engages the wormwheel 9, the motor circuit cannot be closed so long as the clamping disk is held between the jaws 20 by the operation of the shaft 24 with the cone head 25 and the disk 26 which keeps the switch 29—30 open as shown. When the shaft 24 is screwed outwards, the clamping means release the shaft 4, the disk 26 is withdrawn from the switch 29—30 and the latter is automatically closed by the spring 31.

The control of the motor circuit by the switch 29—30 does not depend upon the movements of the shaft 11. So long as the socket 28 remains accessible for insertion of the plug 34 the switch 29—30 will function as described.

I claim:

1. In a machine for marking scales on a work blank, a main operating shaft, an electric motor for rotating said shaft, a cable leading from said motor and containing a normally open starting circuit for the motor, a circuit closer on said machine, cooperating means on said cable and said circuit closer for closing said circuit, a clamping device on the machine for periodically clamping said main shaft in non-rotatable position, means in said clamping device automatically engaging said circuit closer to prevent closing of the circuit when the clamping device is operated and means for operating the latter.

2. A machine according to claim 1 characterized by that the said clamping device comprises a clamping disk on the said main shaft, a pair of movable jaws in said machine adapted to engage said clamping disk, a cone shaped member to move said jaws into clamping position, a screw for operating said member, a spring for releasing the jaws from the clamping disk and a disk on said screw for automatically engaging said circuit closer when said clamping device is operated as aforesaid.

HEINRICH BROSCHKE.

REFERENCES CITED

The following references are of record in the file of this patent:

UNITED STATES PATENTS

| Number | Name | Date |
| --- | --- | --- |
| 2,061,487 | Scott | Nov. 17, 1936 |
| 2,221,577 | Dinkel | Nov. 12, 1940 |
| 2,233,798 | Robins | Mar. 4, 1941 |
| 2,257,610 | Kraft | Sept. 30, 1941 |
| 2,387,215 | Fawkes | Oct. 16, 1945 |
| 2,404,153 | Wilhelm | July 16, 1946 |
| 2,475,329 | Leathers | July 5, 1949 |